United States Patent
Sumita et al.

[11] Patent Number: 6,073,170
[45] Date of Patent: Jun. 6, 2000

[54] INFORMATION FILTERING DEVICE AND INFORMATION FILTERING METHOD

[75] Inventors: Kazuo Sumita, Yokohama; Tatsuya Uehara, Tokyo, both of Japan

[73] Assignee: Kabushiki Kaisha Toshiba, Kawasaki, Japan

[21] Appl. No.: 08/970,622

[22] Filed: Nov. 14, 1997

[30] Foreign Application Priority Data

Nov. 15, 1996 [JP] Japan .................................. 8-305007

[51] Int. Cl.⁷ .................................................. G06F 13/00
[52] U.S. Cl. .......................................... 709/218; 707/10
[58] Field of Search ................... 709/218, 219; 707/10

[56] References Cited

U.S. PATENT DOCUMENTS

| | | | |
|---|---|---|---|
| 5,404,505 | 4/1995 | Levinson | 707/10 |
| 5,754,939 | 5/1998 | Herz et al. | 455/4.2 |
| 5,901,287 | 5/1999 | Bull et al. | 709/218 |
| 5,970,489 | 10/1999 | Jacobson et al. | 707/10 |
| 5,983,214 | 11/1999 | Lang et al. | 707/1 |
| 5,987,454 | 11/1999 | Hobbs | 707/4 |
| 5,999,940 | 12/1999 | Ranger | 707/103 |

*Primary Examiner*—Kenneth Coulter
*Attorney, Agent, or Firm*—Oblon, Spivak, McClelland, Maier & Neustadt, P.C.

[57] ABSTRACT

A topic storage section organizes the addresses for an information providing sources entered from a topic managing section, the pointers to information acquisition drivers stored in an information acquisition driver storage section, and the pointers to search conditions stored in a search condition storage section into groups. The topic storage section then stores such groups by each of the topics classified hierarchically. Then, an information selecting section acquires information from the information providing source for the topic stored in the topic storage section by means of the information acquisition driver corresponding to the information providing source. Thereafter, the information selecting section compares each of the acquired pieces of information with the search condition for the topic stored in the topic storage section and chooses only the pieces of information that conform to the search condition.

14 Claims, 14 Drawing Sheets

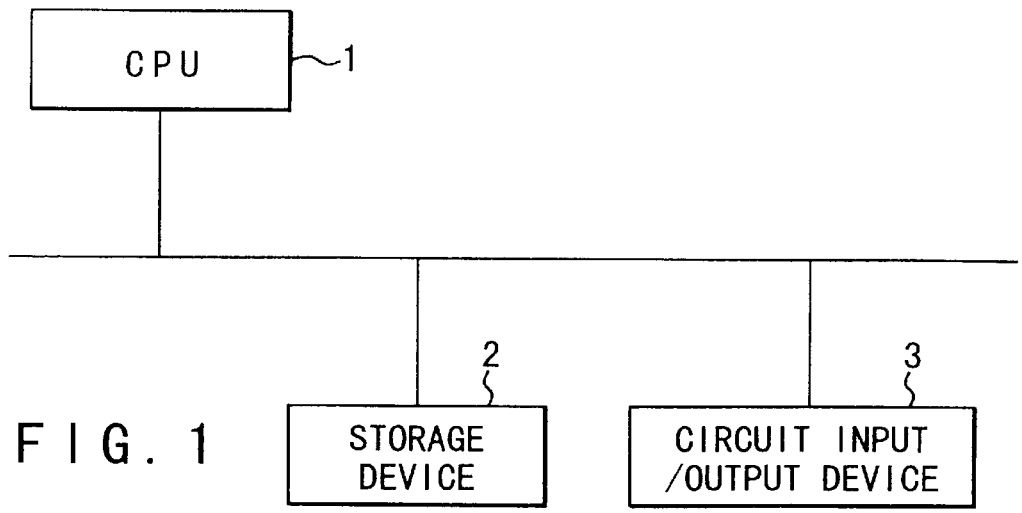
F I G. 1
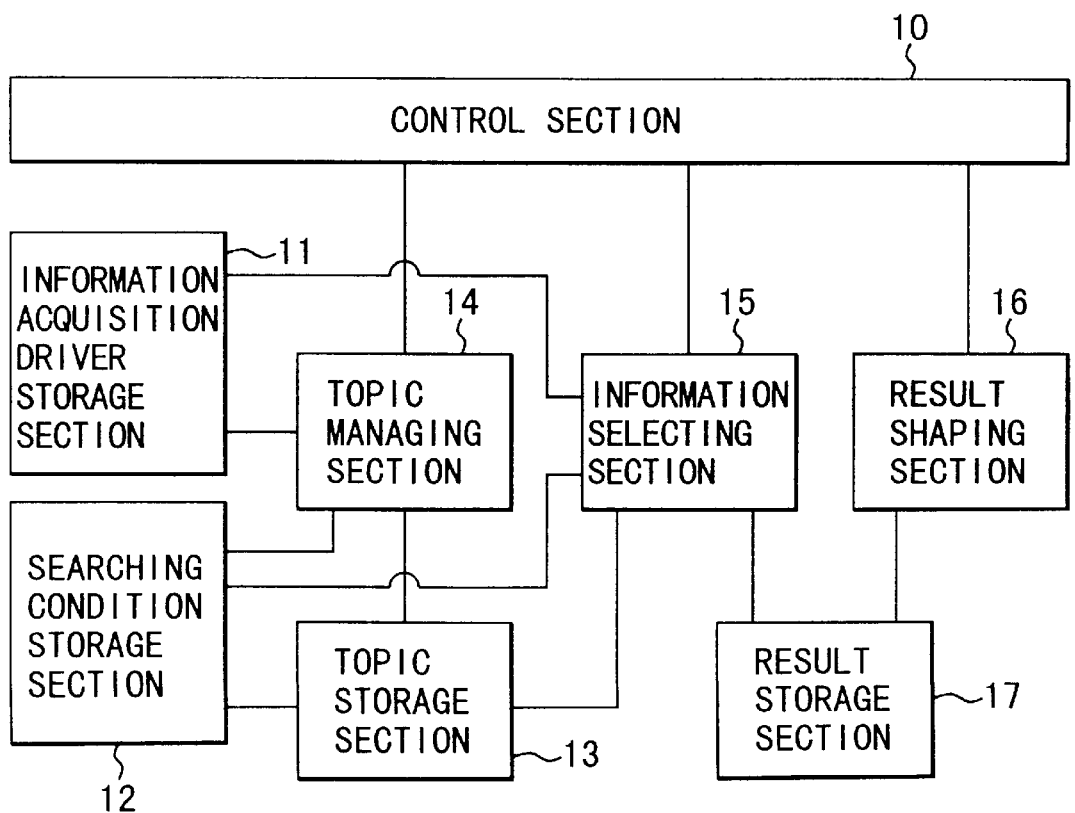
F I G. 2

FIG. 6

| END | CANCEL |
|---|---|
| TYPE | ⊙ WATCH SITE |
| | ○ NEWS SITE |
| | ○ NEW ARRIVAL/SEARCH SITE |
| NAME | a a a a a a |
| ADDRESS | b b b b |
| DRIVER | c c c c |

FIG. 7A

| END | CANCEL |
|---|---|

INTRANET

NETWORK

IN-COMPANY NETWORK

FIG. 7B

| END | CANCEL |
|---|---|
| NAME | PERSONAL COMPUTER |

| DRIVER NAME 1 | FILE NAME 1 THAT HAS STORED DRIVER |
|---|---|
| DRIVER NAME 2 | FILE NAME 2 THAT HAS STORED DRIVER |
| DRIVER NAME 3 | FILE NAME 3 THAT HAS STORED DRIVER |
| ⋮ | ⋮ |

FIG. 8

| NAME OF TOPIC |
|---|
| POINTER TO BROTHER TOPIC |
| POINTER TO CHILD TOPIC |
| POINTER TO WATCH SITE LIST |
| POINTER TO NEWS SITE |
| POINTER TO NEW ARRIVAL/SEARCH SITE |
| NAME OF SEARCHING CONDITION FILE |

FIG. 9

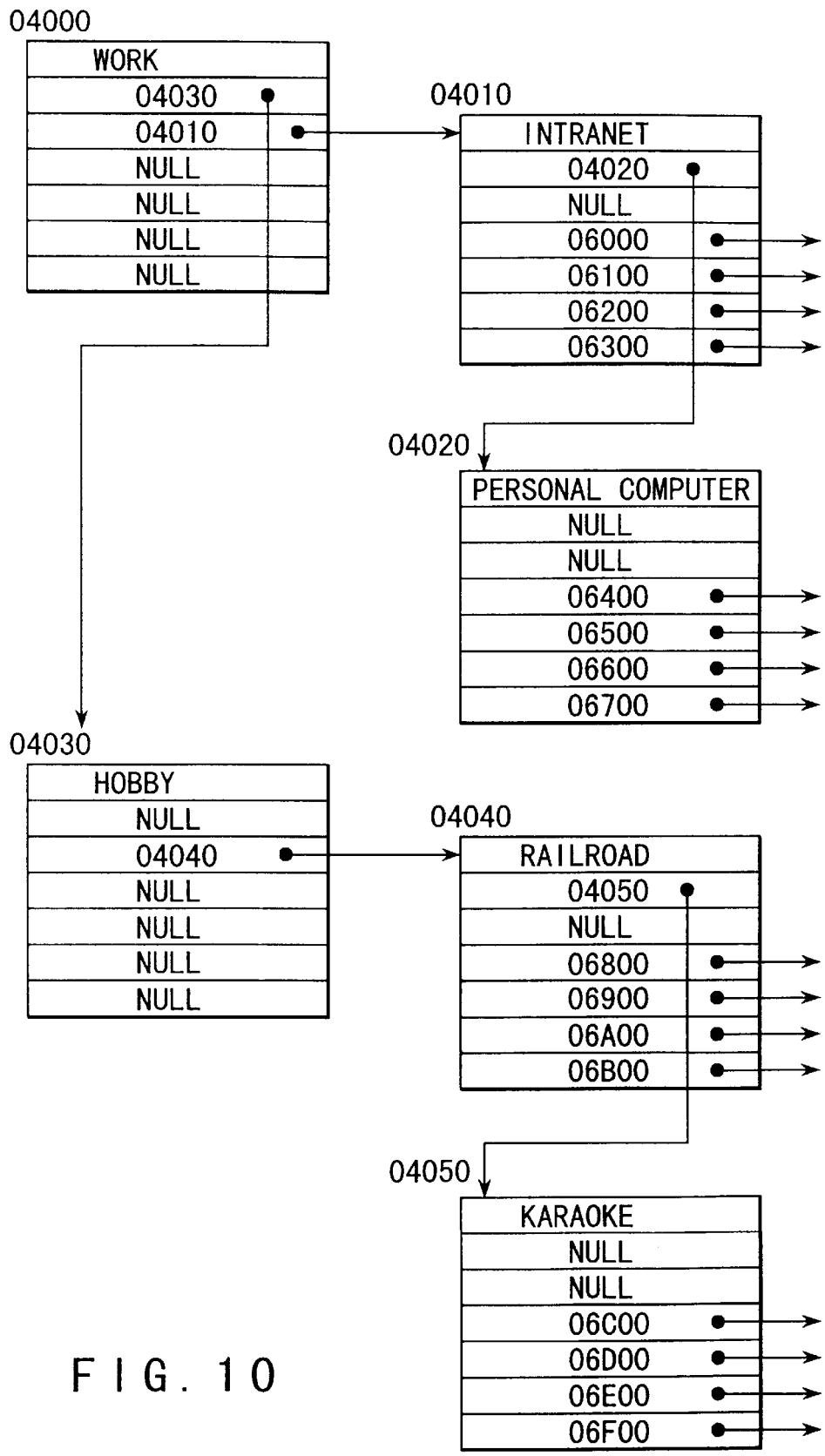
F I G. 10

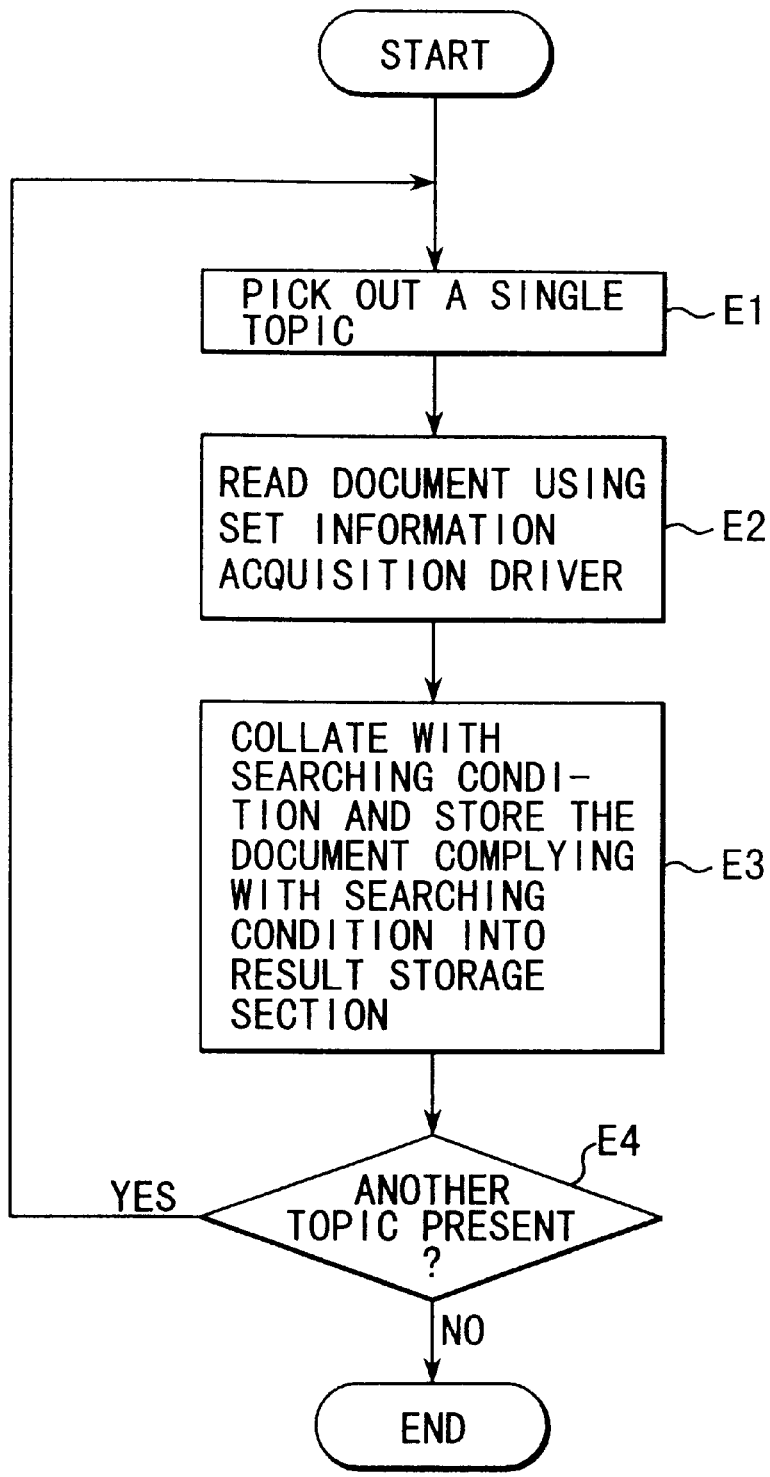
F I G. 19

FIG. 20

| NAME OF TOPIC |
| TYPE |
| TITLE |
| ADDRESS |
| SIMILARITY |

| | |
|---|---|
| WORK<br>　　　INTRANET<br>PERSONAL COMPUTER<br>HOBBY<br>　　　RAILROAD<br>　　　KARAOKE | PERSONAL COMPUTER<br><br>WATCH SITE<br>　× × × × × × ×<br>――――――<br>――――――<br>　○○○○<br>――――――<br><br>NEWS SITE<br>　△△△△<br>――――――<br>――――――<br>　○○○○○○○<br>――――――<br>―――――― |

FIG. 21

INFORMATION FILTERING DEVICE AND INFORMATION FILTERING METHOD

BACKGROUND OF THE INVENTION

This invention relates to an information filtering device which selects the pieces of information that conform to a search condition from a plurality of distributed pieces of information and provides users with the selected pieces of information.

The present invention relates to an information filtering method of selecting the pieces of information that conform to a search condition from a plurality of distributed pieces of information and providing users with the selected pieces of information.

Furthermore, the present invention relates to an information recording medium in which a program capable of effecting such information filtering has been stored.

In recent years, the Internet has been popularized remarkably. Users can access the information stored in computers scattered all over the world, provided that the computers have been connected to the Internet.

With WWW (World Wide Web), use of HTTP enables users to easily access pieces of information dispersed all over the world with the help of GUI (Graphical User Interface)-based browsers.

In WWW, a software program called httpd is used on a particular computer. At the request of another computer, the program transfers hypertext files written in HTML (HyperText Markup Language) stored in the database of the computer.

Computers connected to the Internet can read the specified file by giving the address of the hypertext file to the httpd running on a computer that has the hypertext file to be transferred.

Since in the HTML description, the address is written as link information in the hypertext file, browsers complying with the protocol HTTP can display hypertext files under the rule of each httpd.

When browsers are provided with the function of outputting various type of data, including sound, still pictures, and moving pictures, they can display hypertexts including multimedia data items.

The mechanism of WWW enables users to access pieces of information scattered over the Internet easily, which promotes a lot of individuals and companies to open their hypertext files (or Web pages) to the public.

WWW has no supervisor of Internet databases. Users create and modify their Web pages whenever they like. Since the number of Web pages is very large (the number of Web pages open to the public all over the world at the beginning of 1996 was estimated at 40,000,000), it is difficult for users to find where their desired Web pages are (or to determine what URL addresses to specify to acquire the necessary Web pages).

To cope with the problem, a system for searching for accessible Web pages on a content basis has recently been developed and Web page searching services have been available.

With Web search servers, users can search for Web pages including a specific keyword by specifying the keyword. The user searches for the necessary Web pages using the Web search servers.

Although use of such Web search servers enables users to make an on-line search for the necessary information easily, this is limited only to the case where the user has specified the necessary information for search.

Specifically, when the user has not given a search instruction even if the information that the user is interested in has been created newly, the user will not know the existence of the information, no matter how important the information is.

Therefore, a system that notifies a relevant user of the existence of interesting information is needed. In conventional database systems, such a function is called SDI (Selective Disseminative Information).

With SDI, users register the keywords to select pieces of interesting information in the system beforehand as personal profiles.

When a new data item has been registered, the system compares the data item with the keyword (profile). If the data item coincides with the keyword, the system will inform the user who has registered the profile that the desired information has been produced newly.

With such a conventional database, since individual data items exist in a local environment or are supervised by a specific database supervisor, it is easy to distinguish the newly produced data item from the existing data items.

With WWW, however, users each can register their own Web pages and there is no supervisor who controls the entire WWW. It is therefore very difficult to distinguish the new data item from the existing data items. To solve this problem, various information filtering devices have recently been proposed.

In the case of superdistributed document databases for which no standardized management rules for document registration, update, and deletion have not been determined, the following three types of interesting data items can be considered.

Each user who publicizes information opens pieces of information to the public in the form of hypertext documents. Let's call such a set of documents a site.

(1) A site that always offers the information that users are very interested in. As soon as any change or update has been made, users wants to receive notice of the change or update. For example, a site run by a railroad lovers' association falls under this site. Let's call such a site a watch site.

(2) A site where Web pages are frequently updated. The information that users are interested in is not always registered. If pieces of information that users have interest in are present, they want to receive notice of the existence. A site that carries newspaper articles or magazine articles falls under this site. Let's call such site a news site.

(3) A site whose address users don't know in contrast to the above two types of sites whose addresses they know and from which they want to receive notice only when a data item that they are interested in has been registered. Let's call such a site an unspecified site.

Even with the recently proposed information filtering devices, it is impossible to selecting appropriate pieces of information efficiently by switching between those three types of sites suitably and provide users with the selected pieces of information.

When a user has interest in a plurality of topics, the same site or sites and a search condition are given equally to all of the topics. Therefore, it is hardly said that efficient information filtering is being done.

To overcome the shortcoming, when a user has interest in a plurality of topics, it is necessary to set topic by topic not only under what search condition pieces of information are selected but also what site has information on the topic.

BRIEF SUMMARY OF THE INVENTION

When conventional information filtering is applied to superdistributed document databases, such as WWW, appropriate information filtering cannot be done according to the type of appearance of pieces of information that users are interested in.

It is, accordingly, an object of the present invention to provide an information filtering device that enables efficient information filtering by organizing information providing sources and search conditions into groups and manages them on a topic basis.

Another object of the present invention is to provide an information filtering method that enables efficient information filtering by organizing information providing sources and search conditions into groups and manages them on a topic basis.

Still another object of the present invention is to provide an information recording medium that stores a program capable of effecting such information filtering.

To achieve the above-mentioned object, according to a first aspect of the present invention, there is provided an information filtering device comprising:

topic managing means for organizing the addresses for information providing sources and search conditions into groups and managing the groups by each of the previously registered topics; and information selecting means for acquiring information from the information providing source identified by the address for the information providing source managed by the managing means and selecting pieces of information from the acquired information using the search condition belonging to the same group as that of the address for the information providing source corresponding to the acquired information.

According to a second aspect of the present invention, the information filtering device according to the first aspect, wherein the topic managing means includes in the groups a method of acquiring the information corresponding to the information providing source identified by the address for the information providing source and manages the resulting groups; and the information selecting means acquires the information stored in the information providing source by a method of acquiring information corresponding to the information providing source.

According to a third aspect of the present invention, the information filtering device according to the first aspect, wherein the topic managing means manages the topics hierarchically.

According to a fourth aspect of the present invention, the information filtering device according to the second aspect, wherein the topic managing means manages the topics hierarchically.

According to a fifth aspect of the present invention, the information filtering device according to the third aspect, further comprising topic registering means for registering the topics.

According to a sixth aspect of the present invention, the information filtering device according to the fourth aspect, further comprising topic registering means for registering the topics.

According to a seventh aspect of the present invention, the information filtering device according to the third aspect, further comprising creation means for creating a screen that displays by topic the pieces of information selected by the information selecting means.

According to an eighth aspect of the present invention, the information filtering device according to the fourth aspect, further comprising creation means for creating a screen that displays by topic the pieces of information selected by the information selecting means.

According to an ninth aspect of the present invention, the information filtering device according to the first aspect, further comprising changing means for changing the topics registered in the topic managing means.

According to a tenth aspect of the present invention, the information filtering device according to the first aspect, further comprising delete means for deleting the topics registered in the topic managing means.

According to an eleventh aspect of the present invention, there is provided an information filtering method comprising the steps of:

organizing the addresses for information providing sources and search conditions into groups and managing the groups by each of the previously registered topics; and acquiring information from the information providing source identified by the address for the information providing source and selecting pieces of information from the acquired information using the search condition belonging to the same group as that of the address for the information providing source corresponding to the acquired information.

According to a twelfth aspect of the present invention according to eleventh aspect, further comprising the step of creating a screen that displays by topic the selected pieces of information.

According to a thirteenth aspect of the present invention, there is provided an information filtering method comprising the steps of:

classifying topics hierarchically and registering them;

organizing the addresses for information providing sources and search conditions into groups and managing the groups by each of the previously registered topics; and acquiring information from the information providing source identified by the address for the information providing source and selecting pieces of information from the acquired information using the search condition belonging to the same group as that of the address for the information providing source corresponding to the acquired information.

According to a fourteenth aspect of the present invention, the information filtering method according to the thirteenth aspect of the present invention, further comprising the step of creating a screen that displays by topic the selected pieces of information.

According to a fifteenth aspect of the present invention, there is provided a computer program produce for operating a computer, comprising:

a computer readable medium;

first program instruction means for instructing a computer processor to organize the addresses for information providing sources and search conditions into groups and manage the groups by each of the previously registered topics; and second program instruction means for instructing the computer processor to acquire information from the information providing source identified by the address for the information providing source and select pieces of information from the acquired information using the search condition belonging to the same group as that of the address for the information providing source corresponding to the acquired information, wherein each of the program instruction means is recorded on the medium in executable form and is loadable into the computer for execution by the processor.

According to a sixteenth aspect of the present invention according to the fifteenth aspect, further comprising third program instruction means for instructing the computer processor to create a screen that displays by topic the selected pieces of information.

Of the above aspects of the present invention, the effects of the information filtering device will be explained.

In the first aspect of the present invention, the topic managing means organizes the addresses for information providing sources and search conditions into groups and managing the groups by topic. The information selecting means acquires information from the information providing source specified by the address for the information providing source managed for each topic and selects pieces of information from the acquired information using the search condition managed for the topic.

Specifically, with the information filtering device of the invention, instead of acquiring pieces of information on all the topics from the same information providing source and selecting pieces of information from the acquired information using the same search condition as in a conventional filtering device, the acquisition and selection of pieces of information are carried out for each topic by means of the information providing source and search condition for the topic. This prevents unnecessary information from being acquired as much as possible, which enables efficient information filtering.

In the second aspect of the invention, the topic managing means includes a method of acquiring the information corresponding to the information providing source identified by the address for the information providing source in the groups and manages the resulting groups. The information selecting means acquires the information stored in the information providing source by an information acquiring method corresponding to the information providing source.

This enables access to a plurality of information providing sources that require different information acquiring methods, without switching operations. This feature makes it easier to use the browser.

In the fifth and sixth aspects of the invention, the topic registering means for registering topics is further provided. Users, therefore, can register topics serving as the indexes for information filtering, according to their interests.

Furthermore, in the seventh and eighth aspects of the invention, because the creation means is used to create a screen that displays by topic the pieces of information selected by the information selecting means, the screen for the result of filtering can be made more legible.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of the hardware configuration of an information filtering device according to an embodiment of the present invention;

FIG. 2 is a functional block diagram of the information filtering device of the embodiment;

FIG. 6 shows an example of the search condition edit screen and an example of the topic name edit screen in the information filtering device of the embodiment;

FIG. 7A shows the setting of the information acquisition driver in the information filtering device of the embodiment;

FIG. 7B shows the setting of the information acquisition driver in the information filtering device of the embodiment;

FIG. 8 shows the data format in the information acquisition driver storage section in the information filtering device of the embodiment;

FIG. 9 shows the data format in the topic hierarchy in the information filtering device of the embodiment;

FIG. 10 shows pieces of information in the topic hierarchy in the information filtering device of the embodiment;

FIG. 19 is a first flowchart for the processing at the information selecting section in the information filtering device of the embodiment;

FIG. 20 shows the data format in the result storage section in the information filtering device of the embodiment; and FIG. 21 shows a display screen in the information filtering device of the embodiment.

DETAILED DESCRIPTION OF THE INVENTION

Figure 3:
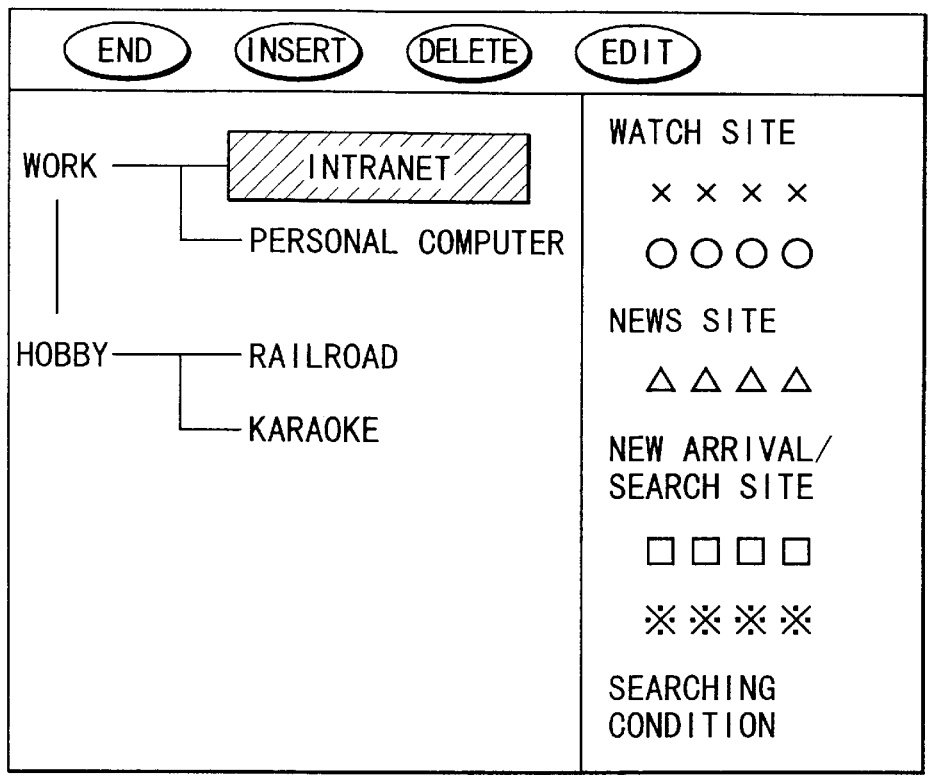
FIG. 3 shows a topic hierarchy management screen in the information filtering device of the embodiment.

Hereinafter, referring to the accompanying drawings, an embodiment of the present invention will be explained.

FIG. 1 shows the hardware configuration of an information filtering device according to an embodiment of the present invention.

As shown in the figure, the information filtering device according to the embodiment comprises a CPU 1 for executing a filtering process, a storage device 2 for storing programs and various data items, and a circuit input/output device 3 for reading data from another computer.

The present invention can be embodied in software. The invention may be provided in the form of floppy disks or CD-ROMs on which the invention has been stored. It is also possible to store the invention on a magnetic disk or the like beforehand and provide it in such a manner that users can get it through a network.

FIG. 2 is a functional block diagram of the present invention.

A control section 10 supervises the control of the entire information filtering processing.

An information acquisition driver storage section 11 stores information acquisition drivers that users can choose at a topic managing section 14.

A search condition storage section 12 stores the search conditions that the user has entered at the topic managing section 14.

A topic storage section 13 organizes the information providing source addresses entered by the user at the topic managing section 14, the pointers to the information acquisition drivers that define a method for processing, and the pointers to the search conditions stored in the search condition storage section 12 into groups and stores the groups on a topic basis.

The topic managing section 14 not only displays the contents stored in the topic storage section 13 but also defines the information providing source according to the user's input and sets search conditions.

An information selecting section 15 acquires the information in the information providing source stored in the topic storage section 13 with use of the information acquisition driver and then compares each of the acquired pieces of information with the search condition and chooses the piece of information that conform to the search condition.

A result shaping section 16 shapes the piece of information chosen at the information selecting section 15 according to the classification hierarchy stored in the topic storage section 13.

Before explanation of the data format stored in each storage section and the flow of processing, the general operation will be explained briefly.

FIG. 3 shows an example of a screen appearing in the topic managing section 14. A hierarchical structure of a topic is shown on the left of the screen as shown in FIG. 3. In the example of FIG. 3, "INTRANET" and "PERSONAL COMPUTER" are set as topics at a lower level than the topic "WORK." "RAILROAD" and "KARAOKE" are set as topics at a lower level than the topic "HOBBY."

At the right of the screen, the watch site, news site, and new arrival/search site set to the topic chosen on the left side of the screen are displayed. The example of FIG. 3 means that "XXXX" and "〇〇〇〇" have been set to the watch site corresponding to the topic "INTRANET," "ΔΔΔΔ" has been set to the new site, and "□□□□" and "Ẍ·Ẍ·Ẍ·Ẍ" have been set to the new arrival/search site (all of these have been stored in the topic storage section 13).

In FIG. 3, the buttons appearing at the top are used to define a new topic (insert button), delete a topic (delete button), and edit a topic (edit button). The process corresponding to each of the buttons is started by choosing one of the buttons with the help of a pointing device, such as a mouse.

Figure 4A:
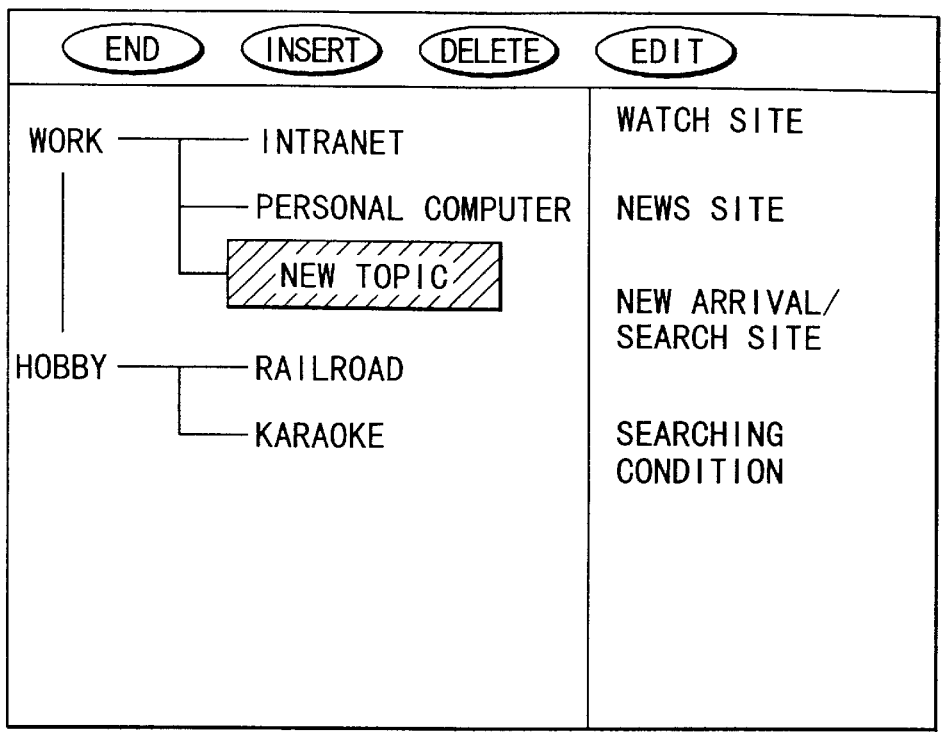
FIG. 4A is an illustration to help explain a screen at the time of topic insertion in the information filtering device of the embodiment.

For example, on the topic management screen of FIG. 3, when the user chooses the topic "WORK" and then choose INSERT, "NEW TOPIC" is inserted under the topic "PERSONAL COMPUTER" as shown in FIG. 4A.

Figure 4B:
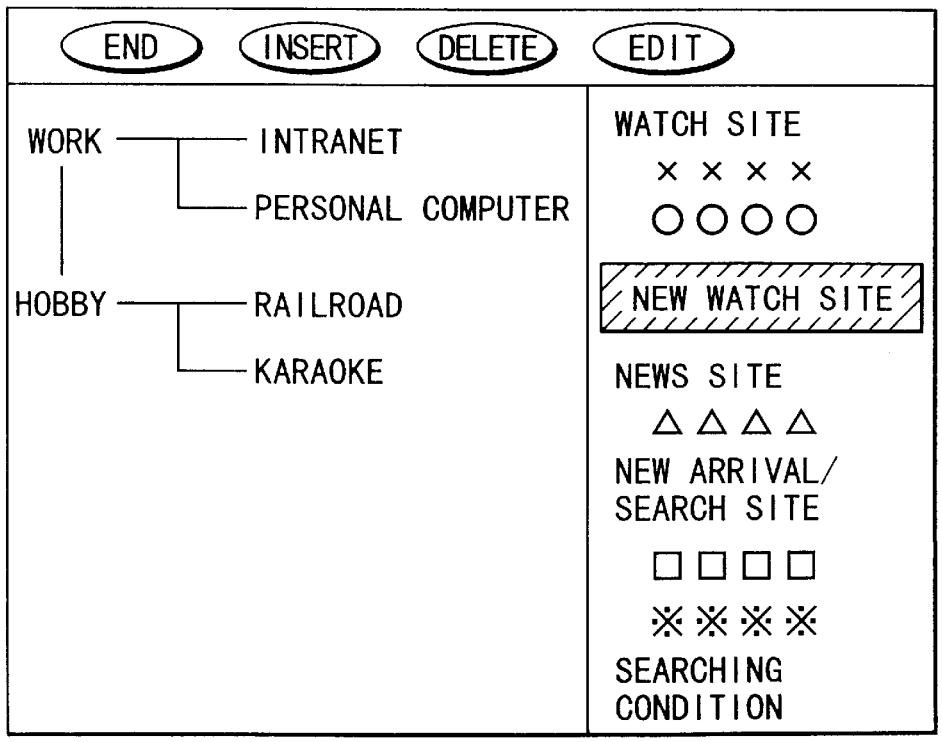
FIG. 4B is an illustration to help explain a screen at the time of topic insertion in the information filtering device of the embodiment.

When the user chooses WATCH SITE on the screen of FIG. 3 and then chooses INSERT, "NEW WATCH SITE" is inserted as shown in FIG. 4B.

Figure 5:
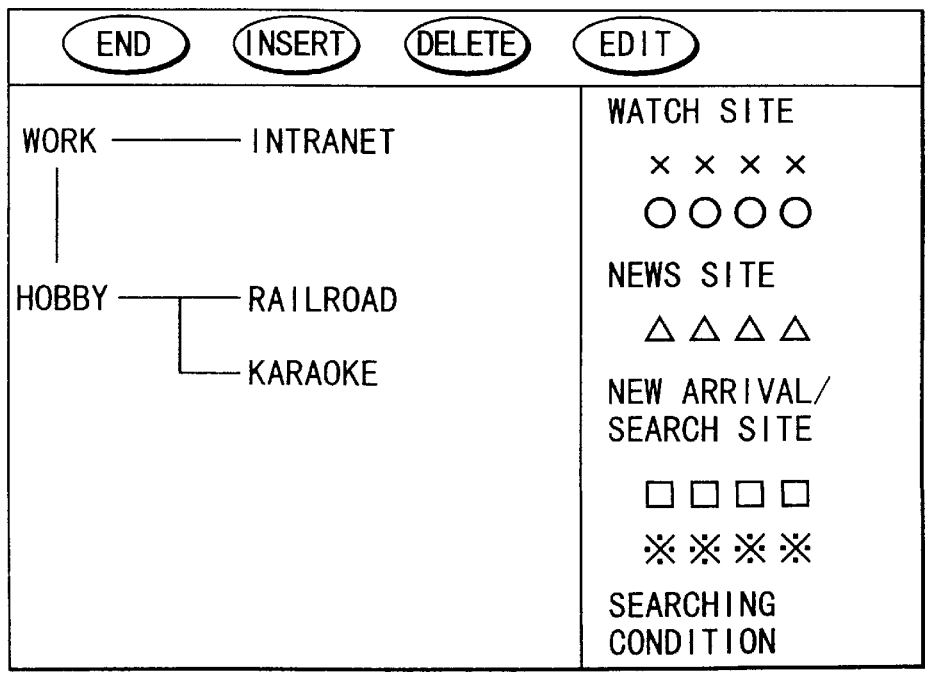
FIG. 5 is an illustration to help explain a screen at the time of topic deletion in the information filtering device of the embodiment.

When the user chooses the topic "PERSONAL COMPUTER" on the screen of FIG. 3 and then chooses DELETE, the topic "PERSONAL COMPUTER" is deleted as shown in FIG. 5.

For the watch site, news site, and new arrival/search site, too, when the user chooses one of the sites and then selects DELETE, the chosen site is deleted from the registration in the watch site, news site, or new arrival/search site.

When the user chooses any one of the watch site, news site, and new arrival/search site on the screen of FIG. 3 and chooses EDIT, the setting screen for each site appears as shown in FIG. 6.

On the screen, the user not only sets the type of a site, the name of a site, and the address for a site but also chooses an information acquisition driver.

When the user chooses SEARCH CONDITION and then chooses EDIT on the screen of FIG. 3, a search condition edit screen appears as shown in FIG. 7A. The search condition edit screen enables the user to edit the search condition.

When the user chooses a node in the hierarchy on the left of the screen of FIG. 3 and chooses SELECT, a screen for changing the name of the node appears as shown in FIG. 7B. This screen enables the user to change the character strings appearing in the topic hierarchy.

As explained in the examples of screens, the present invention not only manages users' interests on the basis of a hierarchical topic classification but also enables the type of information providing source, its address, and the search condition for selecting the content to be set on a topic basis.

This realizes efficient information acquisition according to each topic.

Now that an outline of the operations on the screens have been given, the data storage format in the storage section and the flow of processing that are necessary to realize the above-described operation will be explained.

FIG. 8 shows an example of the data format in the information acquisition driver storage section 11.

As shown in FIG. 8, the name of a driver and the name of a file storing the driver are paired and stored in the information acquisition driver storage section 11. An information acquisition driver not only reads a document from an information providing source using the protocol HTTP but also performs an individual process according to the type of the site.

For instance, at a newspaper publishing company's site, a plurality of articles are opened to the public as a single document. When a plurality of articles have been offered in the form of a single document, the collation of the entire document with the search condition prevents the information selecting section 15 from choosing the documents accurately.

To overcome this drawback, the information acquisition driver for dealing with a newspaper publishing company's site that opens a document consisting of articles to the public, reads the document, divides the articles, and performs an information selecting process on each of the divided articles.

To sense the generation of the related information at unspecified sites, the present invention takes into account the use of new arrival/search sites. A new arrival site is a site run in such a manner that a person who has made a new site contributes the contents of the site to the management server at a site that manages new arrival sites and the server places the contributed contents in a document at the new arrival site for a specific period of time.

The present invention has nothing to do with how such a new arrival site is run. In this type of new arrival site, sentences of introduction of new arrival sites have been grouped into a single document and the document has been registered.

Because of this, it is necessary to perform a dividing process on each of the sentences of introduction in addition to reading a document, as with the aforementioned information acquisition driver dealing with a newspaper publishing company.

A search site corresponds to a search server that receives the search condition and searches for Web pages on-line. To acquire a Web page using the protocol HTTP, a GET command is transmitted to the httpd running on the computer that has stored the document, using the address for the document to be acquired as a parameter.

On the other hand, the httpd transfers the document corresponding to the address to the computer that has sent the GET command. Therefore, such a search server requires the search condition to be specified.

Specifying the search condition is effected by appending a character string of the argument (the search condition such as a keyword) to the search program to the document address corresponding to the search program in the search server specified by the parameter in the GET command.

For instance, in the following example, "Titles" is the name of the search program, "?" is a delimiter from the argument, and "&" is a delimiter between arguments. In addition, "qt=Giants" indicates that the keyword for search condition is "Giants" and "nh=10" is an argument specifying the number of documents outputted as a result of searching for the searching program.

GET/Titles?qt=Giants&nh=10

The driver corresponding to the search site creates an argument for searching for individual search servers from the search conditions stored in the search condition storage section 12 and issues a GET command.

When Web pages are searched for by the Web search server, the addresses for a plurality of pages that comply with the specified search condition can be obtained. With the present invention, of the acquired addresses, the pages for those not acquired in the previous filtering are inputted to the information selecting section 15.

The search site driver stores the result of the preceding search (not shown) and treats the pages for the addresses not included in the result of the preceding search as new pages in the next search.

In the processing at the driver corresponding to the watch site, the contents of the document read in the previous filtering (not shown) are stored and a modification to the preceding document is sensed by comparing the read document with the contents.

Figure 14A:
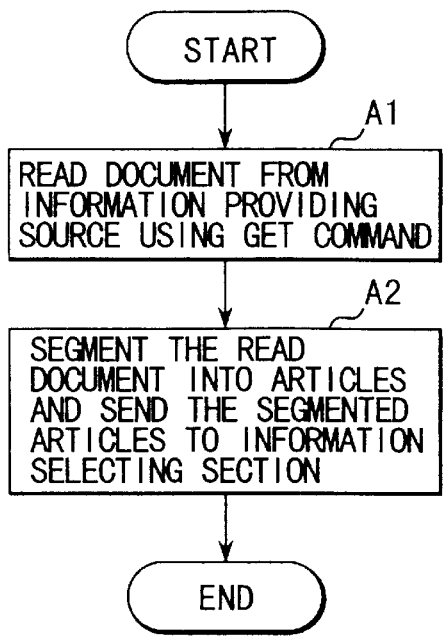
FIG. 14A is a flowchart for the processing at the news site driver in the information filtering device of the embodiment.
Figure 14B:
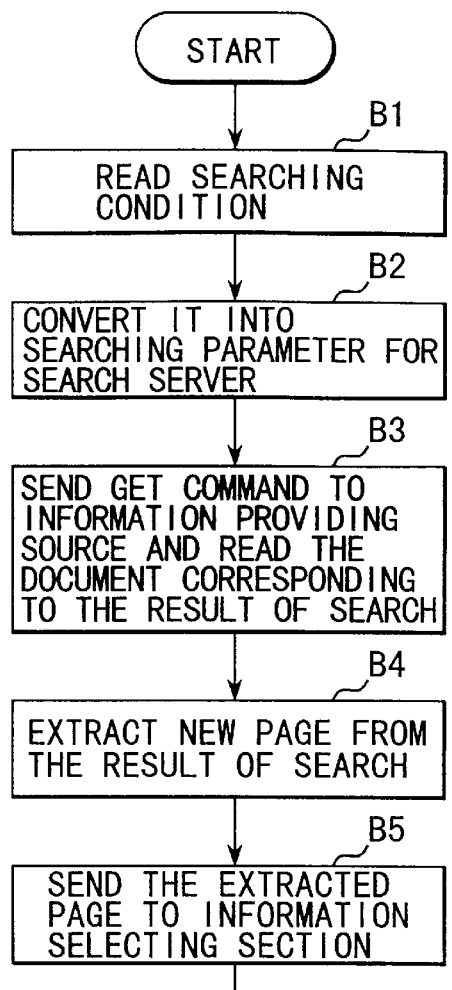
FIG. 14B is a flowchart for the processing at the search site driver in the information filtering device of the embodiment.

Typical processing flows for the news site driver, search site driver, and watch site driver are shown in FIGS. 14A and 14B.

FIG. 14A is a flowchart for the processing at the news site driver.

As shown in the figure, the news site driver reads a document from the information providing source using a GET command (step A1). Then, the news site driver segments the read document into articles and sends the segmented articles to the information selecting section 15 (step A2).

FIG. 14B is a flowchart for the processing at the search site driver.

As shown in the figure, the search site driver reads the search condition from the search condition storage section 12 (step B1). Then, the search site driver converts the search condition into a search parameter to the search server (step B2).

Next, the search site driver sends the GET command to the information providing source and reads the retrieved document (step B3). Then, the search site driver extracts a new page from the result of the searching (step B4) and sends the extracted page to the information selecting section 15 (step B5).

Figure 14C:
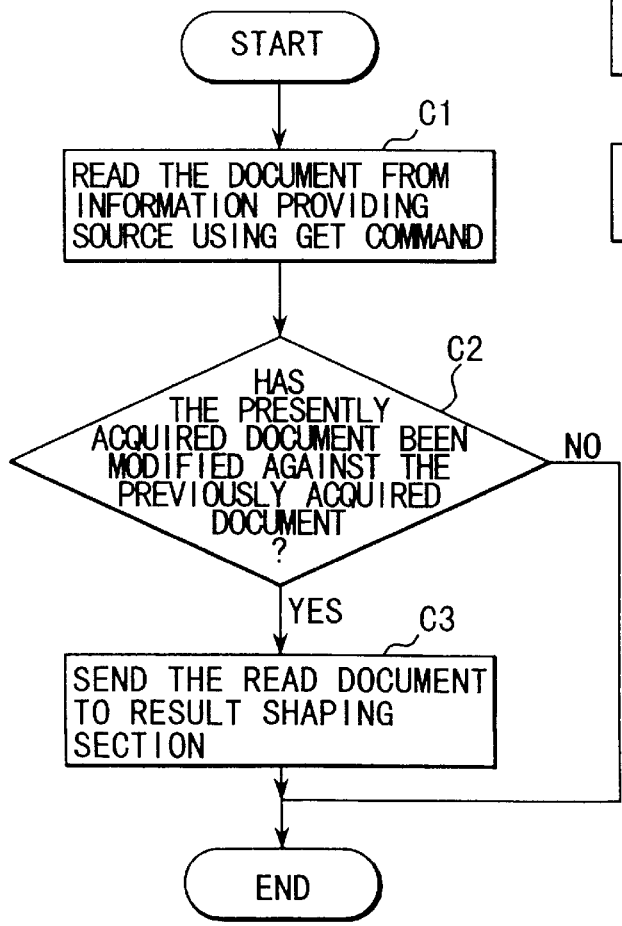
FIG. 14C is a flowchart for the processing at the watch site driver in the information filtering device of the embodiment.
Figure 15:
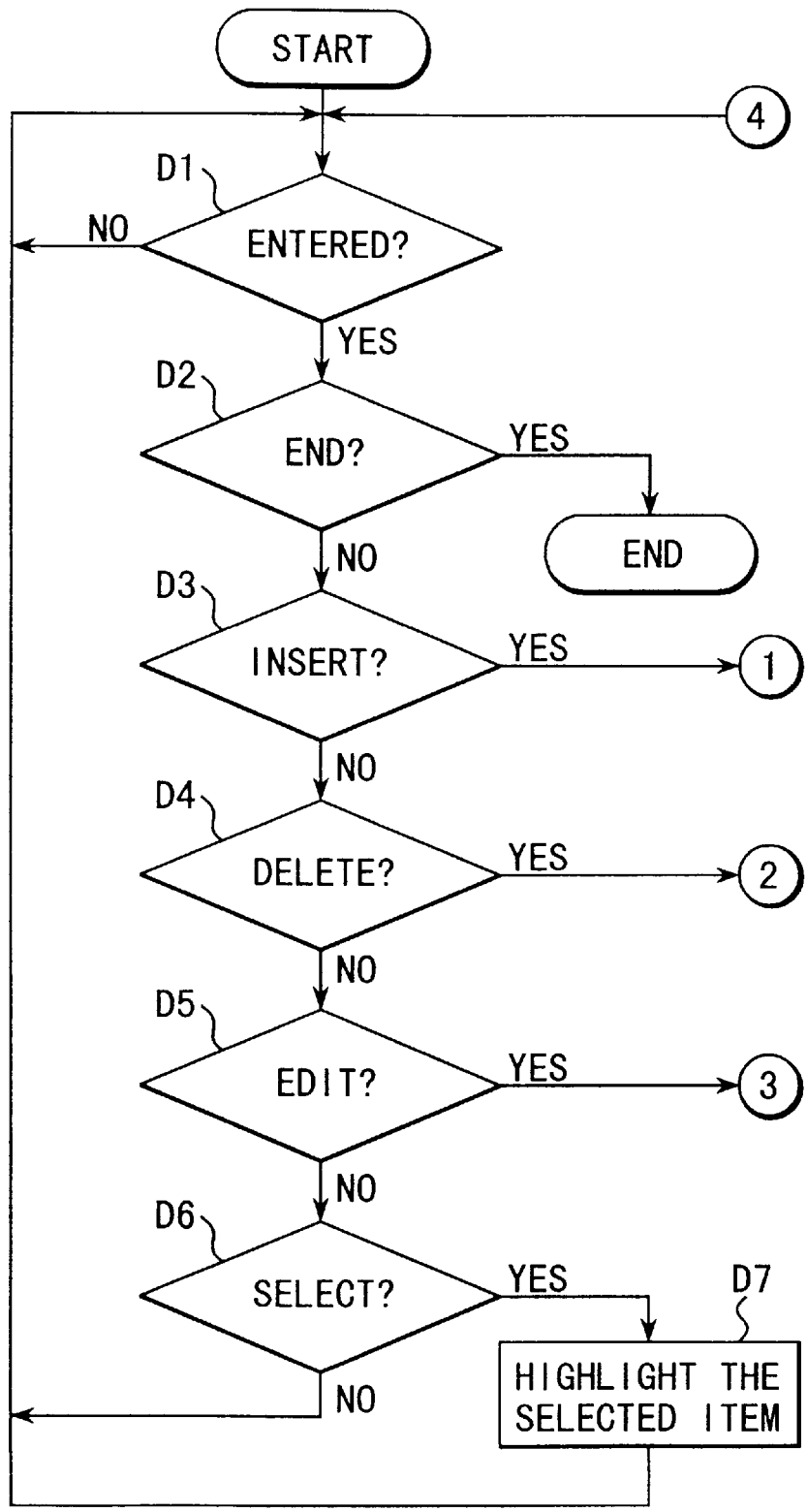
FIG. 15 is a first flowchart for the processing at the topic managing section in the information filtering device of the embodiment.
Figure 16:
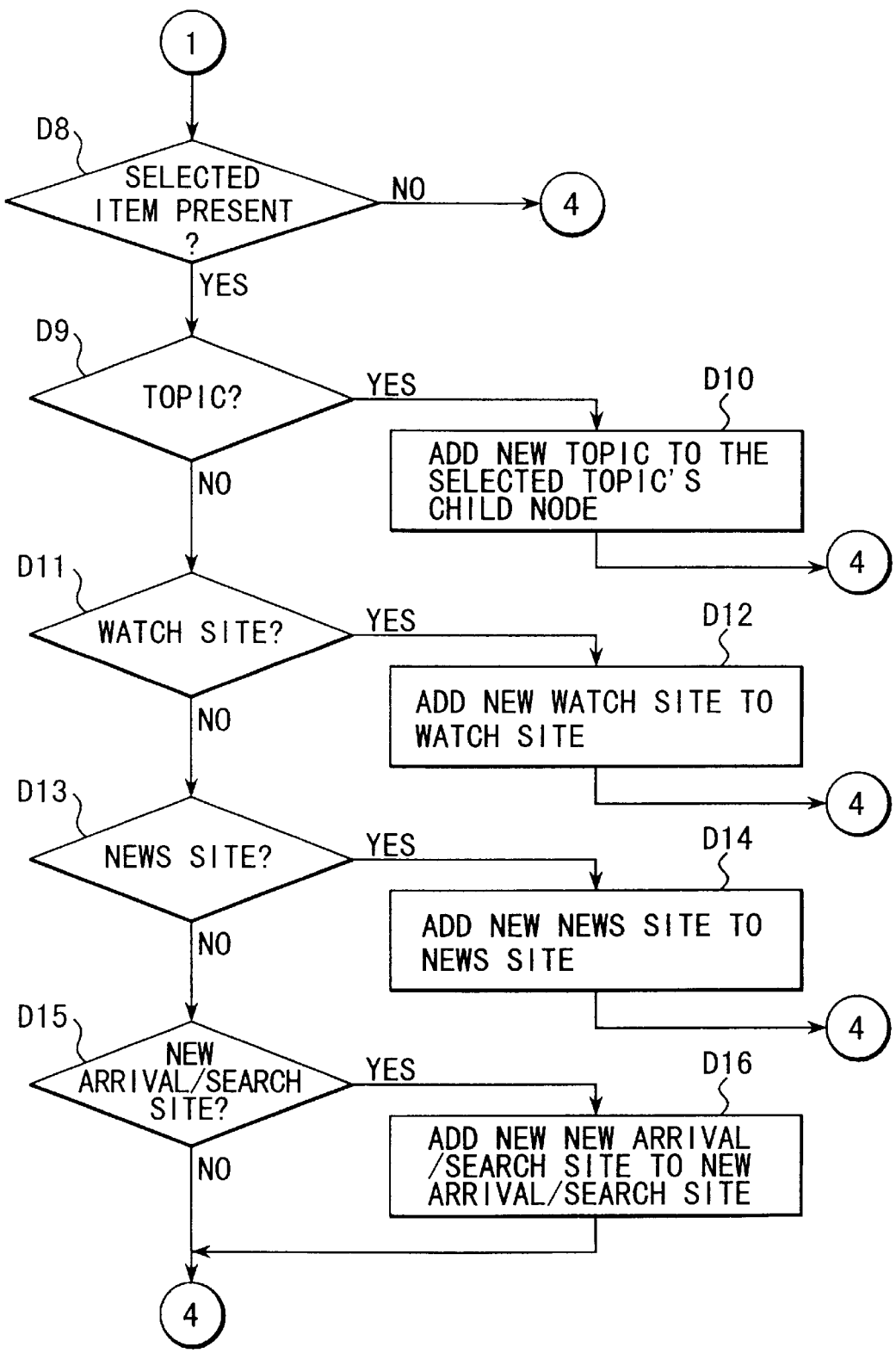
FIG. 16 is a second flowchart for the processing at the topic managing section in the information filtering device of the embodiment.
Figure 17:
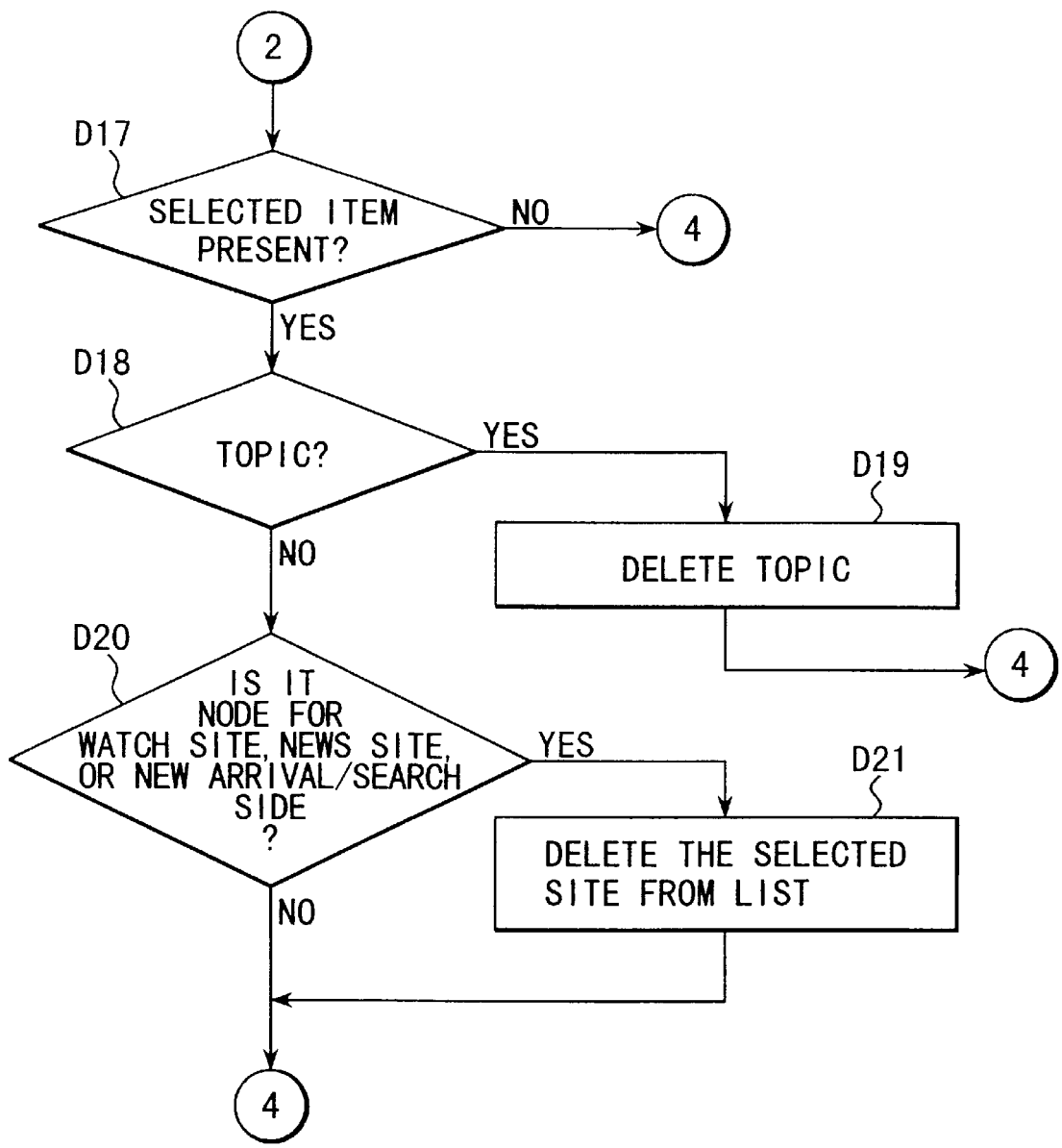
FIG. 17 is a third flowchart for the processing at the topic managing section in the information filtering device of the embodiment.
Figure 18:
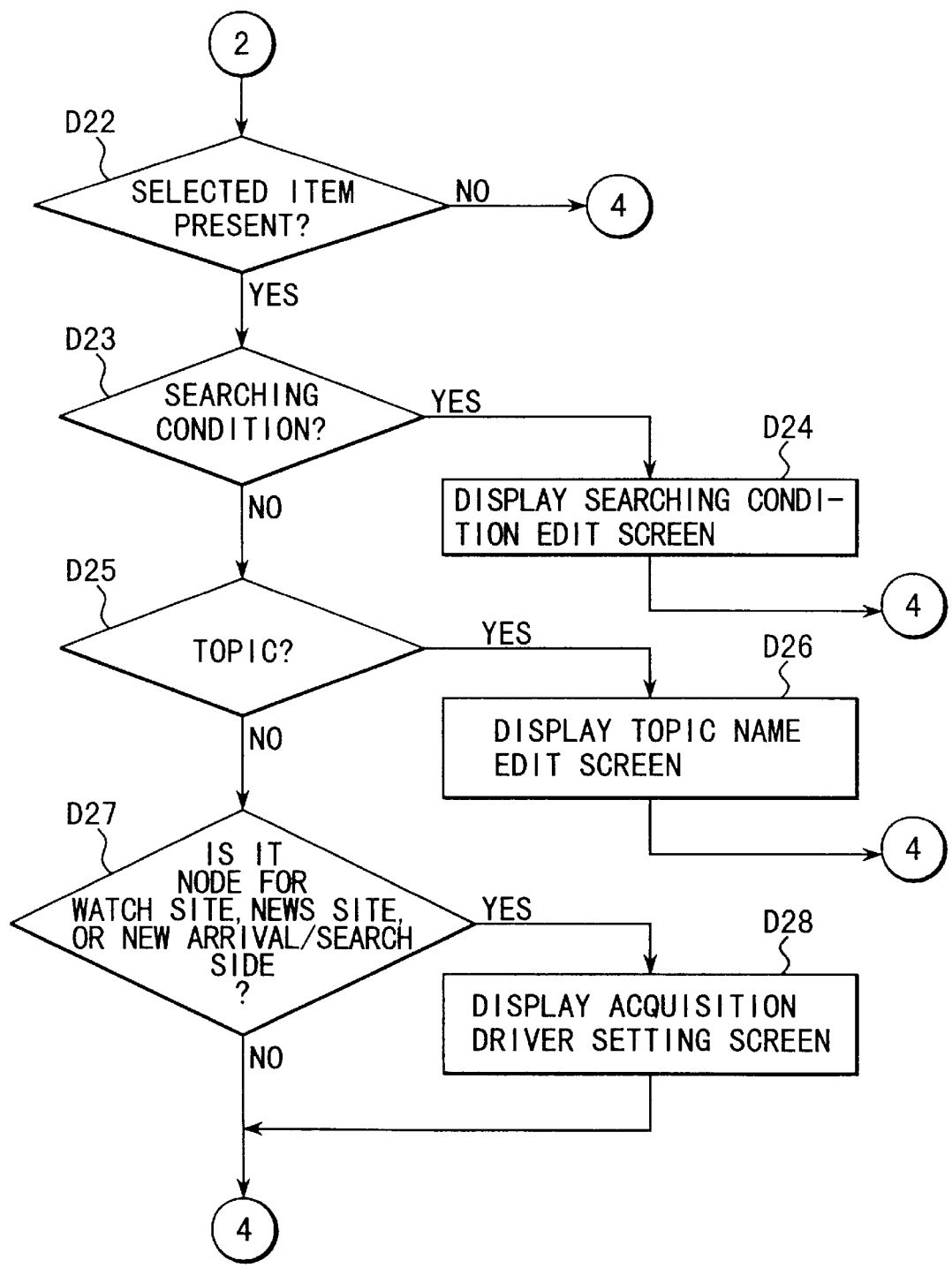
FIG. 18 is a fourth flowchart for the processing at the topic managing section in the information filtering device of the embodiment.

FIG. 14C is a flowchart for the processing at the watch site driver.

As shown in the figure, the watch site driver reads a document from the information providing source using a GET command (step C1). Then, the watch site driver judges whether or not the contents of the document at the information providing source differ from those of the preceding document (step C2).

At step C2, if it has been judged that the preceding document has been modified, the watch site driver will send the read document to the result shaping section 16 (step C3). At step C2, if it has been judged that the document at the document providing source is the same as the previously acquired document, the watch site driver will terminate the process.

It goes without saying that the step of judging whether or not the contents of the document at the information providing source differ from those of the previously acquired document in the flowchart of FIG. 14C may be added to the flowchart of FIG. 14A.

As explained above, the information acquisition driver issues search arguments according to the type of site and analyzes the format. The internal processing of the driver is not associated with the purport of the invention.

In short, the present invention is characterized in that such an information acquisition driver is stored in the information acquisition driver storage section 11 for each information providing source in order to allow users to choose the driver.

FIG. 9 shows the data format for each node in the topic hierarchy. As shown in FIG. 9, the data format consists of an area for storing the name of a topic, an area for storing a pointer to brother topics, an area for storing a pointer to child topics, an area for storing a pointer to a watch site list, an area for storing a pointer to a news site list, an area for storing a pointer to a new arrival/search site list, and an area for storing the names of search condition files. As an example, the contents of the topic hierarchy corresponding to the example of FIG. 3 is shown in FIG. 10.

Figure 11:
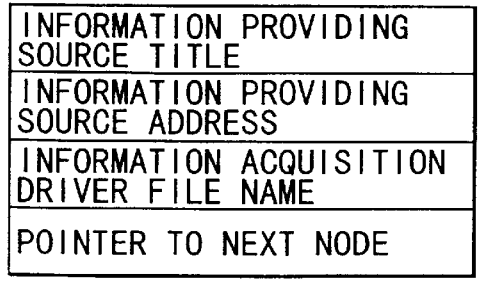
FIG. 11 shows the data format in the watch site in the information filtering device of the embodiment.

The individual topics of the topic hierarchy hold the pointers to the corresponding watch site, news site, and watch site lists. FIG. 11 shows the data format for one node in the watch site list.

As shown in FIG. 11, the data format consists of the title of the information providing source, the address for the information providing source, the file name of the driver for acquiring information, and the pointer to the next node.

Figure 12:
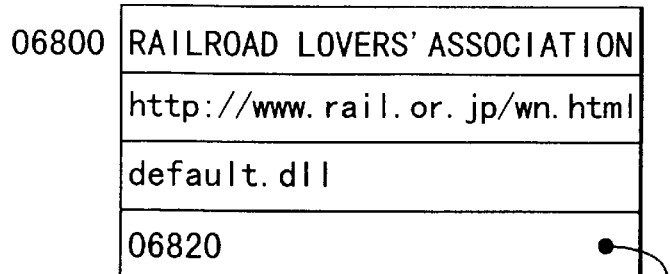
FIG. 12 shows pieces of information in the watch site list in the information filtering device of the embodiment.

FIG. 12 shows an example of a watch site list. In FIG. 12, the list includes two watch sites: RAILROAD LOVERS' ASSOCIATION and RAILROAD TRAVELERS' SOCIETY.

Figure 13:
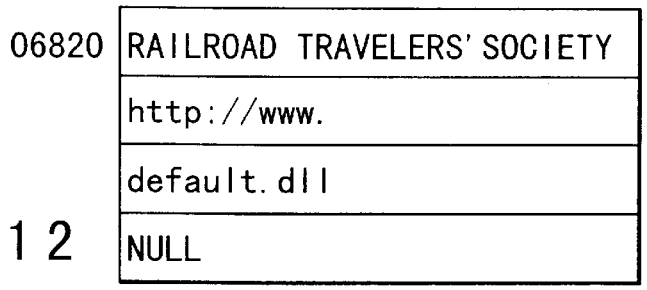
FIG. 13 shows pieces of information in the watch site list in the information filtering device of the embodiment.
Figure 13:
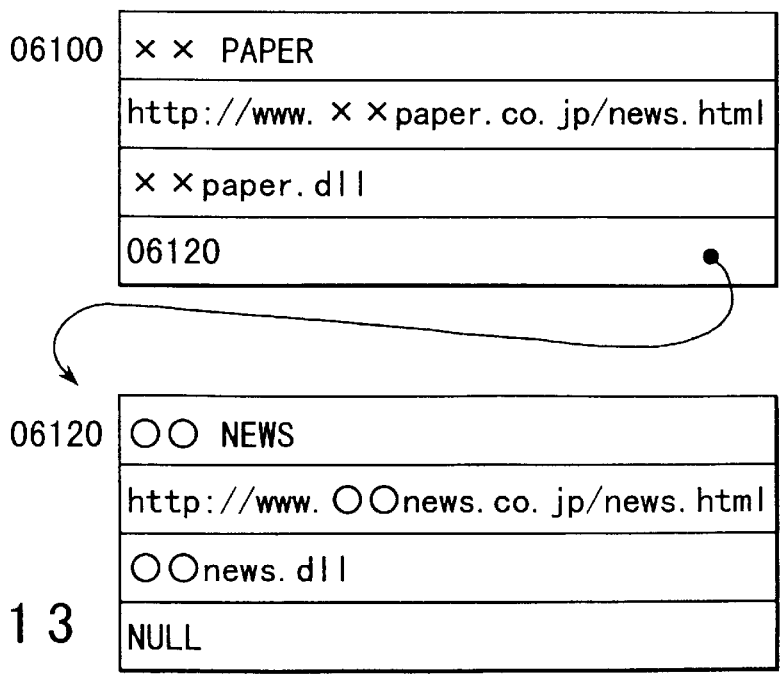

The data format of the news site list and that of the new arrival/search site list are similar to the above format. For example, an example of the contents of the news site list is shown in FIG. 13.

On the basis of the data described above, the topic managing section 14 manages topics. FIGS. 15 to 18 show the flow of processing.

The topic managing section 14 carries out processes according to the input from an input device, such as a mouse or a keyboard. The commands that user will possibly enter are END, INSERT, DELETE, and SELECT.

Each of END, INSERT, DELETE, and EDIT is activated by choosing the corresponding button at the top of the screen as shown in FIG. 3. Regarding SELECT, each node in TOPIC, WATCH SITE, NEWS SITE, and NEW ARRIVAL/SEARCH SITE in the topic hierarchy, for example, "XXXX" and "○○○○" can be chosen.

When INSERT has been chosen (Y in step D3), if the just chosen item is TOPIC (Y in step D9), a new topic will be added just under TOPIC (step D10) (see the example of FIG. 4A).

When WATCH SITE has been chosen (Y in step D11), a new watch site is added to WATCH SITE (step D12) (see the example of FIG. 4B). A similar process is carried out for each of NEWS SITE and NEW ARRIVAL/SEARCH SITE.

When DELETE has been chosen (Y in step D4), if the just chosen item is TOPIC (Y in step D18), TOPIC and all the topics under TOPIC will be deleted (step D19).

When the just chosen item is a node in WATCH SITE, NEWS SITE, or NEW ARRIVAL/SEARCH SITE ("XXXX" and "○○○○" in the example of FIG. 3) (Y in step D20), the watch site, news site, or new arrival/search site corresponding to the node is deleted from the list (step D21).

When EDIT has been chosen (Y in step D5), if the just chosen item is SEARCHING CONDITION (Y in step D23), a search condition edit screen as shown in FIG. 7A will be displayed (step D24).

The user corrects the search condition on the screen. When the just chosen item is TOPIC (Y in step D25), a topic name edit screen as shown in FIG. 7B will be displayed (step D26).

The user corrects the topic name on the screen.

When the just chosen item is a node in WATCH SITE, NEWS SITE, or NEW ARRIVAL/SEARCH SITE (Y in step D27), an acquisition driver setting screen as shown in FIG. 6 will be displayed (step D28).

The user sets an information acquisition driver or the address for the information providing source on the screen.

The information selecting section 15 is actuated according the topics set in the topic hierarchy at the time specified by the user or at a predetermined time.

The flow of processing at the information selecting section 15 is shown in FIG. 19. The information selecting section reads documents from the information providing sources set on a topic basis (step E1 and step E2), collates them with the corresponding search condition, and stores the documents conforming to the search condition into the result storage section 17 (step E3).

Collating with the search condition may be done by, for example, a method of checking to see if the target document includes a word in the search condition (keyword searching) or a method of computing the similarity and ranking the result.

Use of the method of computing the similarity enables the results of selection to be arranged in order of similarity in a document to be offered to users.

FIG. 20 shows an example of the data format in the result storage section 17. As shown in FIG. 20, the result storage section 17 consists of an area for the name of a topic, an area for the type of site, such as watch site, news site, or new arrival site, an area for the title of a document, an area for an address, an area for a search condition, and an area for similarity.

According to the contents of the topic storage section 13 and those of the result storage section 17, the result shaping section 16 creates a document to be offered to users. FIG. 21 shows an example of the created document displayed on a Web browser. Because the result storage section 17 stores the titles and addresses of the documents chosen on a topic basis, the pieces of information grouped on a topic basis are displayed.

As described above in detail, with the present invention, the information providing source and the search condition can be organized into a group and hierarchical management of such groups can be achieved easily.

Documents associated with the contents that user take interest in are not distributed universally, but have clustered locally to some extent. This makes it possible to eliminate the acquisition of unnecessary document information and the extraction of information from unnecessary document by organizing the information providing sources and search conditions into groups and handling them on a topic basis. The elimination of these steps improves the processing efficiency remarkably.

Because the result of processing is shown to users in such a manner that it corresponds to the topic hierarchy, the visualization of the result of filtering can be improved substantially.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An information filtering device comprising:

a topic managing section configured to organize addresses for information providing sources, search conditions and information acquisition drivers for acquiring information from the information providing sources into groups and managing the groups by each of previously registered topics, wherein each of the information acquisition drivers is set so as to correspond to the type of the information providing source; and an information selecting section configured to acquire information from the information providing source identified by the address for information providing source managed by said managing section and selecting pieces of information from acquired information by using the search condition and information acquisition driver belonging to the same group as that of the address for the information providing source corresponding to said acquired information.

2. An information filtering device according to claim 1, wherein said topic managing section manages said topics hierarchically.

3. An information filtering device according to claim 2, further comprising a topic registering section for registering said topics.

4. An information filtering device according to claim 1, further comprising a topic registering section for registering said topics.

5. An information filtering device according to claim 2, further comprising a creation section for creating a screen that displays the pieces of information selected by said information selecting section for each of said topics.

6. An information filtering device according to claim 1, further comprising a creation section for creating a screen that displays the pieces of information selected by said information selecting section for each of said topics.

7. An information filtering device according to claim 1, further comprising a changing section for changing the topics registered in said topic managing section.

8. An information filtering device according to claim 1, further comprising a delete section for deleting the topics registered in said topic managing section.

9. An information filtering method comprising the steps of:
  organizing addresses for information providing sources, search conditions and information acquisition drivers for acquiring information from the information providing sources into groups and managing the groups by each of the previously registered topics, wherein each of the information acquisition drivers is set so as to correspond to the type of the information providing source; and
  acquiring information from the information providing source identified by the address for the information providing source and selecting pieces of information from acquired information by using the search condition and information acquisition driver belonging to the same group as that of the address for the information providing source corresponding to said acquired information.

10. An information filtering method according to claim 9, further comprising creating a screen that displays said selected pieces of information for each of said topics.

11. An information filtering method comprising the steps of:
  classifying topics hierarchically and registering classified topics;
  organizing addresses for information providing sources, search conditions and information acquisition drivers for acquiring information from the information providing sources into groups and managing the groups by each of previously registered topics, wherein each of the information acquisition drivers is set so as to correspond to the type of the information providing source; and
  acquiring information from the information providing source identified by address for the information providing source and selecting pieces of information from said acquired information by using the search condition and information acquisition driver belonging to same group as that of the address for the information providing source corresponding to acquired information.

12. An information filtering method according to claim 11, further comprising creating a screen that displays said selected pieces of information for each of said topics.

13. A computer program produce for operating a computer, comprising:
  a computer readable medium;
  first program instruction means for instructing a computer processor to organize addresses for information providing sources, search conditions and information acquisition drivers for acquiring information from the information providing sources into groups and manage the groups by each of the previously registered topics, wherein each of the information acquisition drivers is set so as to correspond to the type of the information providing source; and
  second program instruction means for instructing the computer processor to acquire information from the information providing source identified by the address for the information providing source and select pieces of information from acquired information by using the search condition and information acquisition drivers belonging to same group as that of the address for the information providing source corresponding to said acquired information, wherein each of said program instruction means is recorded on said medium in executable form and is loadable into the computer for execution by the processor.

14. A computer program according to claim 13, further comprising third program instruction means for instructing the computer processor to create a screen that displays by topic said selected pieces of information.

* * * * *